United States Patent
Mooney et al.

(10) Patent No.: US 6,944,442 B2
(45) Date of Patent: Sep. 13, 2005

(54) WIRELESS PHONE FORWARDING BASED ON PHONE LOCATION

(75) Inventors: Philip D. Mooney, Sellersville, PA (US); Joseph M. Cannon, Harleysville, PA (US); James A. Johanson, Macungie, PA (US)

(73) Assignee: Agere Systems Inc., DE (US)

( * ) Notice: Subject to any disclaimer, the term of this patent is extended or adjusted under 35 U.S.C. 154(b) by 560 days.

(21) Appl. No.: 09/845,351

(22) Filed: May 1, 2001

(65) Prior Publication Data

US 2002/0164979 A1 Nov. 7, 2002

(51) Int. Cl.⁷ .............................. H04Q 7/20; H04B 1/38
(52) U.S. Cl. .................. 455/414.1; 455/417; 455/515; 455/516; 455/425; 455/573; 455/416; 455/422
(58) Field of Search ................................ 455/414, 417, 455/423, 424, 425, 426, 515, 516, 517, 574, 575, 572, 573

(56) References Cited

U.S. PATENT DOCUMENTS

| | | | | |
|---|---|---|---|---|
| 5,915,224 A | * | 6/1999 | Jonsson | 455/552.1 |
| 5,920,815 A | * | 7/1999 | Akhavan | 455/426.1 |
| 5,924,044 A | * | 7/1999 | Vannatta et al. | 455/556.1 |
| 5,953,657 A | * | 9/1999 | Ghisler | 455/417 |
| 6,188,888 B1 | * | 2/2001 | Bartle et al. | 455/417 |
| 6,411,802 B1 | * | 6/2002 | Cardina et al. | 455/424 |
| 6,427,074 B1 | * | 7/2002 | Chavez et al. | 455/417 |

* cited by examiner

*Primary Examiner*—Allan Hoosain

(57) ABSTRACT

A system and method for automatically forwarding calls directed to a wireless telephone device is disclosed. A call forwarding operation is automatically enabled in response to the wireless telephone device being at a particular location and is automatically disabled in response to the wireless telephone device leaving said predetermined location.

16 Claims, 9 Drawing Sheets

US 6,944,442 B2

WIRELESS PHONE FORWARDING BASED ON PHONE LOCATION

BACKGROUND OF THE INVENTION

I. Field of the Invention

The present invention relates to a system and method for forwarding calls directed to a wireless telephone device.

II. Description of the Related Art

Today the average individual has a home land-line telephone device, office telephone device and wireless telephone device. In addition, one or more of these telephone devices usually have some type of automated answering system, e.g. voice mail, answering machine, etc. When an incoming caller wishes to contact an individual the large number of telephone devices associated with the individual can often make the task difficult. There exists the possibility of calling several different telephone devices and leaving respective messages at each, without ever reaching the intended individual. In addition to the annoyance of not reaching the intended individual at several different telephone devices, there also may be a charge to the called or calling party associated with each left message.

To help alleviate this problem, the called individual can use the well known call forwarding feature, found in most land-line and wireless systems, to forward all of their calls to a telephone device where they will be located and/or to a telephone device which has the least associated operational cost. For example, an individual may choose to forward his wireless calls to a land-line telephone device, rather than a wireless telephone device, whenever possible. However, this requires that a user consistently enable and disable the call forwarding feature for one or more different telephone devices to which a call should be forwarded. This task can be burdensome. For example, to enable call forwarding one usually must enter a call forwarding code, i.e. "*71", followed by the ten digit telephone number to which the calls are to be forwarded. There is a need for a more efficient system and method for an individual to manage and route their incoming wireless telephone calls in a cost effective way.

SUMMARY OF THE INVENTION

The present invention provides a system and method for automatically forwarding calls from an individual's wireless telephone device to a desired alternative telephone device when the wireless device is at certain locations. The present invention also provides for automatically disabling the call forwarding feature when the conditions which precipitated the call forwarding are no longer existent. In one exemplary embodiment the system includes a wireless telephone which is configured to automatically forward calls whenever it is placed in a battery charger. Whenever the wireless telephone devices is removed from the charger call forwarding automatically ceases.

In yet another exemplary embodiment, calls are automatically forwarded to a respective telephone number based upon a recognition by the wireless telephone device of which unique charger is servicing it. In another exemplary embodiment, a call is automatically forwarded to a respective number based upon which of a plurality of charger inputs on the wireless device the charger is plugged into. In yet another exemplary embodiment, calls are automatically forwarded to a respective number based upon the wireless device being within a predetermined distance of a predetermined device or location.

BRIEF DESCRIPTION OF DRAWINGS

The foregoing and other advantages and features of the invention will become more apparent from the detailed description of exemplary embodiments of the invention given below with reference to the accompanying drawings in which.

DETAILED DESCRIPTION OF PREFERRED EMBODIMENTS

Figure 1:
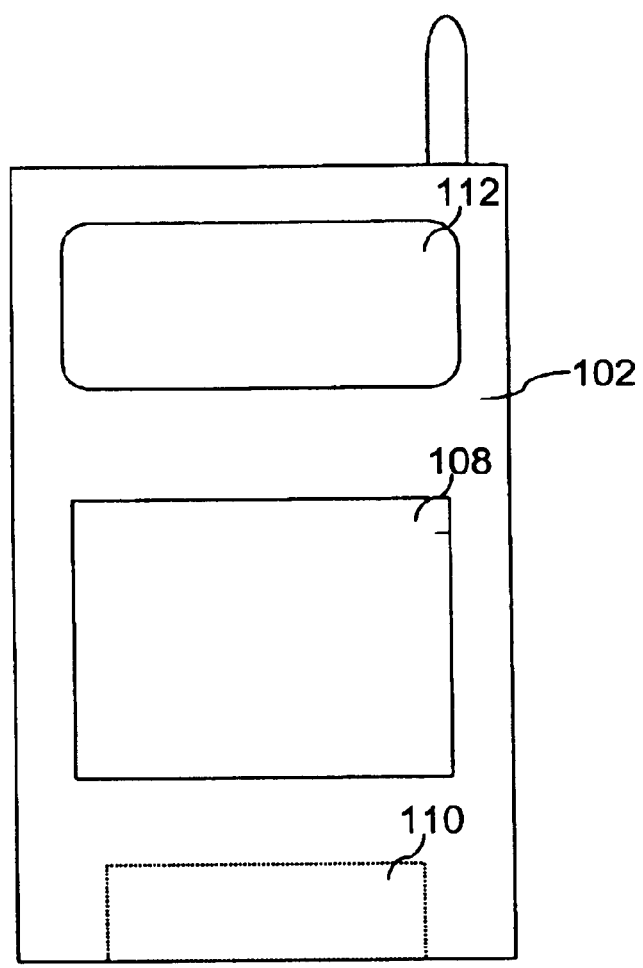
FIG. 1 is an illustration of a wireless telephone device and associated battery charger in according with a first exemplary embodiment of the present invention.
Figure 1:
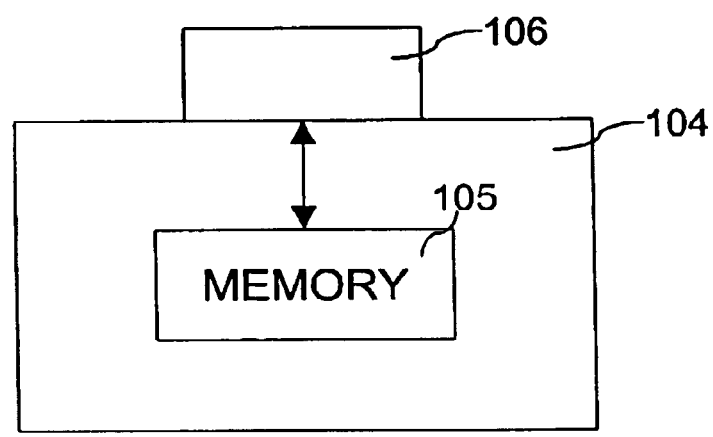

Referring now to the drawings, where like reference numerals designate like elements, FIG. 1 shows an system for forwarding incoming calls directed to a wireless telephone device 102 in accordance with one exemplary embodiment of the present invention. Wireless telephone device 102 includes a display 112, keypad 108 and at least one charger port 110. Wireless telephone device 102 interfaces with charger 104 through charger interface 106 in order to charge the battery of the telephone wireless device 102. The connection between wireless telephone device 102 and charger 104 can also be used as a triggering event for forwarding incoming calls directed to wireless telephone device 102.

Figure 9:
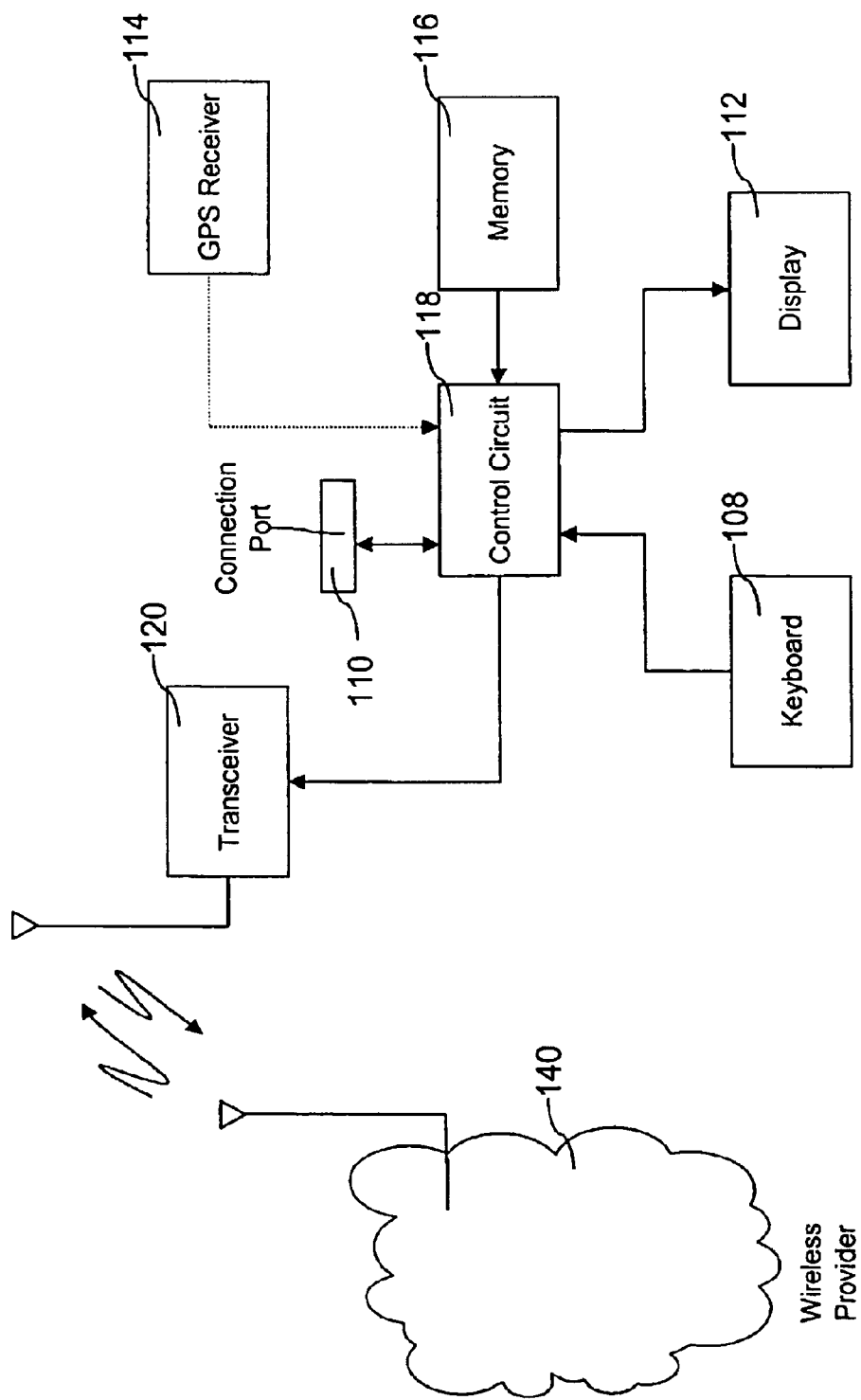
FIG. 9 shows the internal structures of a wireless telephone device which may be used in the exemplary embodiments of the invention.

The wireless telephone device 102 of the invention is depicted in greater detail in FIG. 9. As shown therein, the wireless telephone device 102 includes a control circuit 118, which is coupled to keyboard 108, and display device 112, as well as to a memory 116, a transceiver 120, and a connection port 110. A GPS receiver 114 is also shown, which is used in one of the exemplary embodiments which will be described in detail below. The wireless telephone device 102 is capable of connecting via wireless connection with a wireless service provider illustrated generally as 140 in FIG. 9.

Referring back to FIG. 1, the wireless telephone device 102 is used to first store a forwarding number in a memory 105 of the charger 104. This task is accomplished by a user programming a forwarding number into memory 105. To accomplish this, the wireless device 102 is connected to the charger 104 and the forwarding number is entered on the keypad 108 of wireless telephone device 102. The number is transferred through charger port 110 to charger interface 106 and is stored in memory 105 within charger 104. The number entered is the number to which calls for wireless telephone device 102 will be directed whenever wireless telephone device 102 is connected to the charger 104. This number may conveniently be that of a land-line telephone at the location of the charger 104 or any other telephone device. Anytime a wireless telephone device 102 which is compatible with the charger 104 is docked to the charger 104, the connection with the charger 104 will cause the wireless telephone device 102 to retrieve the forwarding number stored in memory 105 and connect with a wireless service provider, for example, by transmitting the appropriate forwarding operation code and sending the forwarding number, thereby instructing the service provider to automatically forward calls directed to the wireless device 102 to the number stored in the charger 104.

When the wireless telephone device 102 is removed from the charger 104, the wireless telephone device 102 will sense this and automatically again connect with the service provider and send the appropriate code to instruct the service provider to disable call forwarding. Thus, by docking a wireless telephone device 102 into the charger 104, the wireless device is recharged and enables automatic call forwarding to the number stored in the charger 104 and when the wireless device 102 is removed from the charger call forwarding is automatically disabled.

The operation of the embodiment of the invention illustrated in FIG. 1 will now be described in greater detail in connection with FIG. 2, which depicts the operations performed by the wireless telephone device 102 under control of control circuit 118 of FIG. 9. The control circuit 118 may be a hard wired control circuit or more preferably a processor control circuit, in which case the operations thereof are programmed, either in firm ware or in a program stored within memory 116 or elsewhere. The control circuit 118 may be an existing control circuit in wireless telephone device 102 which is normally used for wireless call processing.

Figure 2:
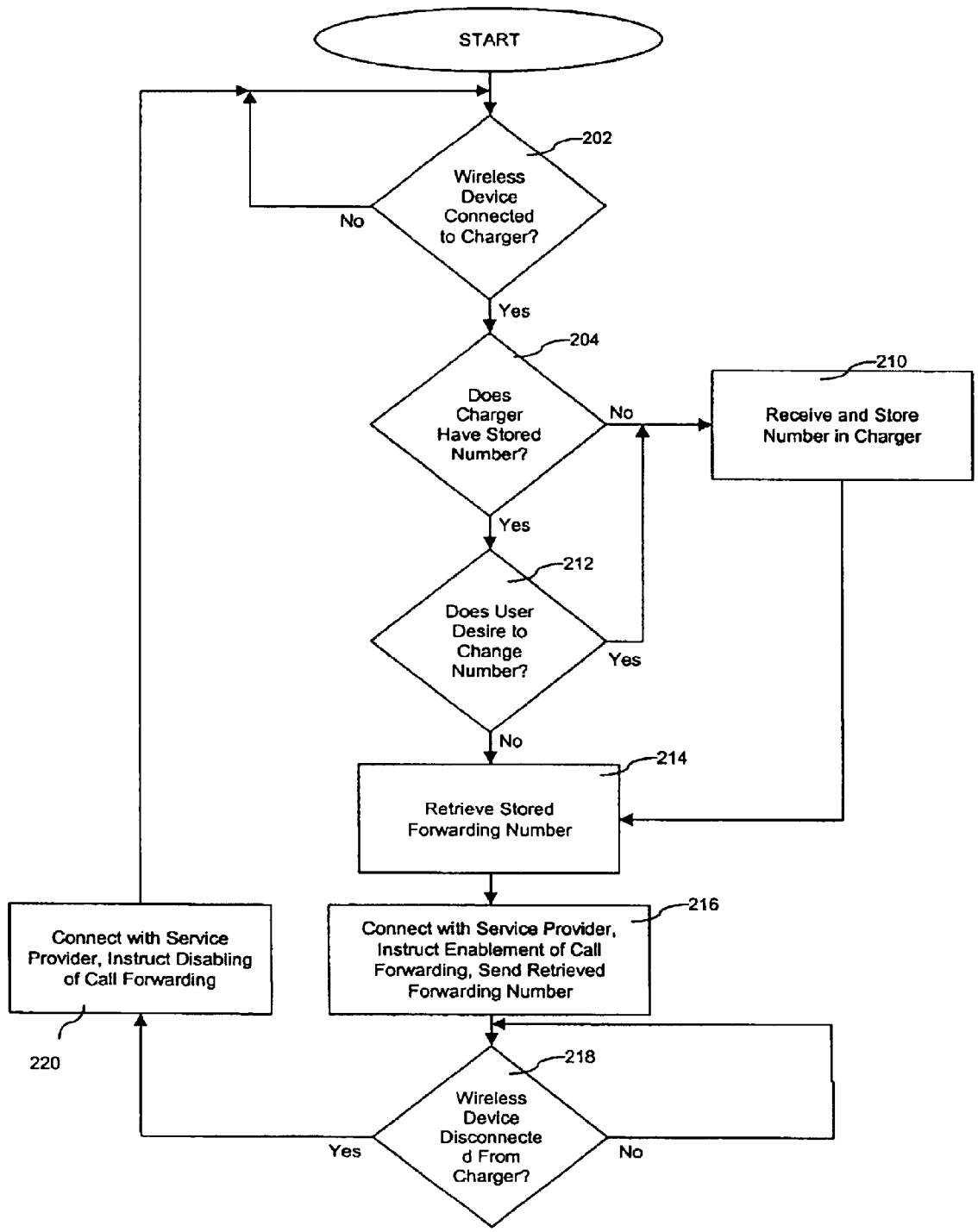
FIG. 2 is a flow chart depicting the operation of the wireless telephone device shown in FIG. 1.

Referring to FIG. 2, a first operational step which is performed at processing segment 202 is to determine whether a wireless telephone device 102 is connected to a battery charger. If not, wireless device 102 continues to loop through processing segment 202 until a connection with a battery charger is detected. If connection to a charger is detected, at processing segment 204 wireless device 102 determines whether the charger has a stored number therein. If so, the wireless device proceeds to processing segment 212, where it determines whether or not a user desires to change the number. If not, the process proceeds to step 214 where a stored number is retrieved from the charger memory, and from there the process proceeds to processing segment 216 where the wireless telephone device 102 makes a connection with the service provider, instructs the enablement of call forwarding, and sends the retrieved forwarding number to the service provider.

If in processing segment 204 it is determined that the charger does not have a stored number, the wireless telephone device proceeds to processing segment 210 where it receives a forwarding number from a keyboard 108 entry and stores the entered forwarding number within the charger memory 105 for later use. Following processing segment 210, the wireless device proceeds to processing segment 214 and executes that step and subsequent steps as described above.

After the processing segment 216, the wireless device 102 checks to see if it becomes disconnected from the charger 104 in processing segment 218. If not, the wireless telephone device 102 loops through processing segment 218 until the disconnection of the wireless telephone device 102 from charger 104 is detected. If a wireless telephone device is disconnected from the charger as detected at processing segment 218, the wireless telephone device 102 proceeds to processing segment 220, where it establishes a connection with the service provider and sends an instruction to disable the call forwarding operation. Following processing segment 220, the wireless device 102 proceeds back to the beginning of processing segment 202, where it loops through signal 202 until another connection is made with a charger.

As a consequence of the FIG. 2 process, when the wireless device is connected to a charger, a call forwarding operation is automatically initiated and a forwarding number as stored in the charger, is sent to the service provider, whereas when the wireless device is disconnected from the charger the call forwarding operation automatically ceases. The FIGS. 1 and 2 embodiment may be used with any number of respective chargers 104, each storing a respective forwarding number.

Figure 3:
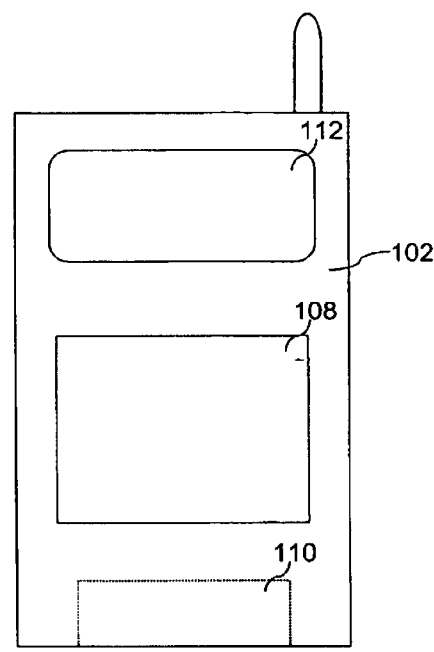
FIG. 3 is an illustration of a wireless telephone device and a plurality of battery chargers in accordance with a second exemplary embodiment of the invention.
Figure 3:
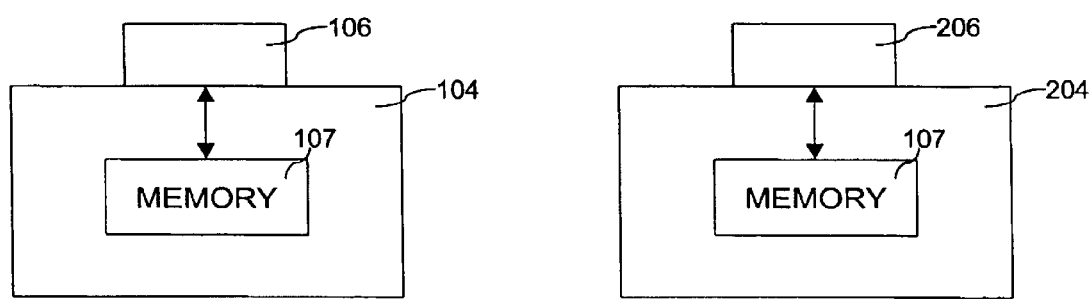

In another exemplary embodiment, illustrated in FIG. 3 instead of having a number of chargers 104, each storing a respective forwarding number, a plurality of chargers 104, 204, etc. may be used with each charger having a predefined unchangeable identification (ID) number assigned to it. For example, charger 102 may have predefined ID number "1" and charger 204 may have predefined ID number "2." In this embodiment, the wireless device 102 stores in memory 116 a list of forwarding numbers in respective association with a charger ID number. For example, the forwarding number "212-555-1212" may be programmed for charger 104 having ID number "1," while a different forwarding number, e.g., "202-555-1212" may be used for charger 204 having ID number "2." In this case, when a configured wireless device 102 is connected with a particular charger 104, 204, etc. wireless telephone device 102 will receive the ID number from the charger and retrieves from its own memory 116 the forwarding number associated with the charger ID. Thereafter, the wireless telephone device 102 automatically connects to the wireless service provider, instructs the enablement of the call forwarding feature and sends the forwarding number to the service provider. Upon the wireless device 102 being removed from the charger, the wireless telephone device 102 will connect with the wireless provider and automatically disable the call forwarding operation.

Figure 4:
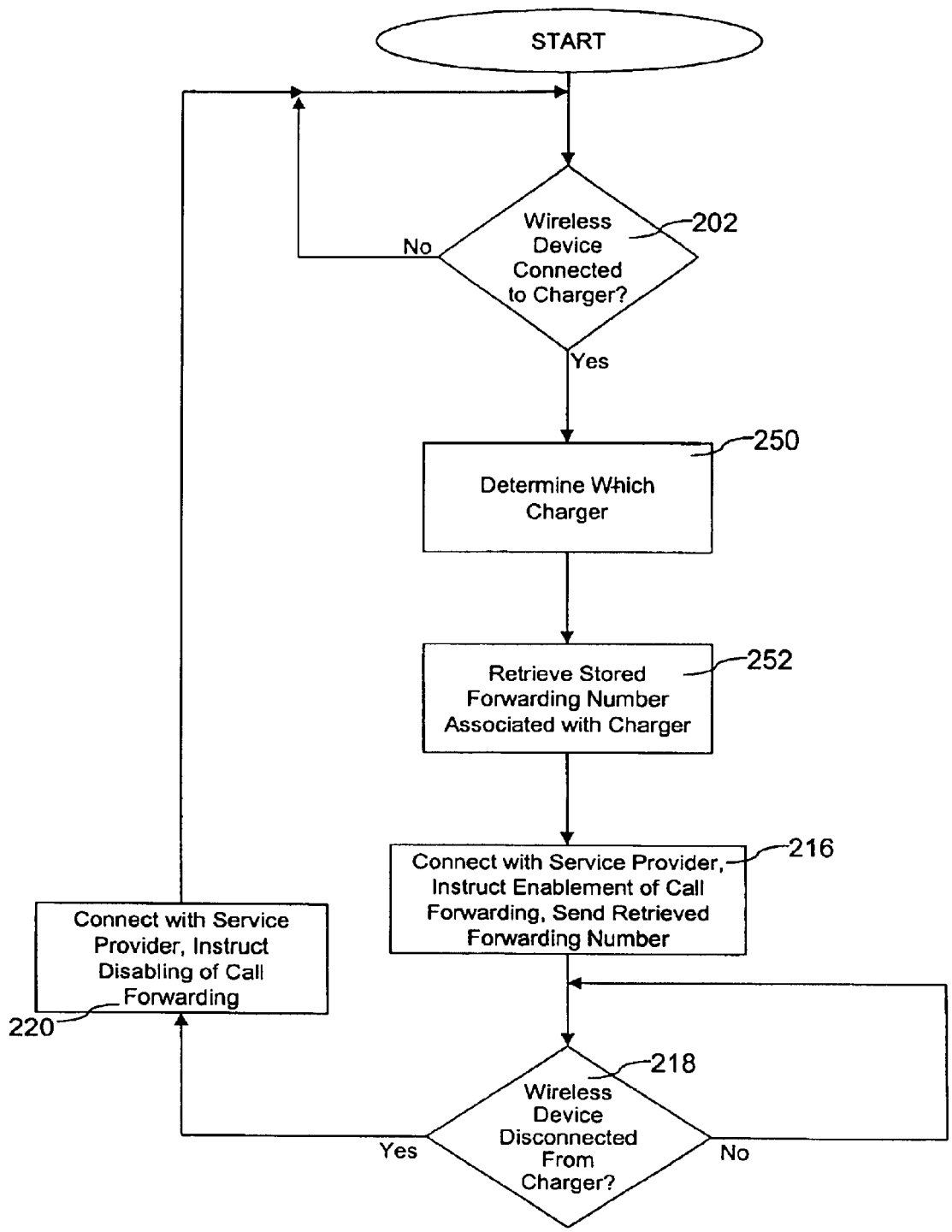
FIG. 4 is a flow chart of the operations performed by the wireless telephone device illustrated in FIG. 3.

The operations performed by wireless telephone device 102 for the system illustrated in FIG. 3 are shown in FIG. 4. At processing segment 202, a wireless telephone device 102 determines whether or not it is connected to a charger. If so, it determines the charger to which it is connected in processing segment 250 by reading the charger ID information, following which in processing segment 252 the wireless telephone device retrieves a forwarding number stored in internal memory 116 of the wireless device, which is associated with the read charger ID number. Once the forwarding number is retrieved in processing segment 252, the wireless telephone device proceeds to processing segment 216 where it connects with a service provider, instructs enablement of a call forwarding operation, and sends the retrieved forwarding number to the service provider. Subsequently, in processing signal 218 the wireless device 102 determines if it has been disconnected from the charger. If it has, the wireless device 102 proceeds to processing segment 220, where it makes a connection with the service provider and instructs the disablement of the call forwarding operation, after which the wireless device proceeds back to processing segment 202 where it waits for another connection to a charger.

Figure 5:
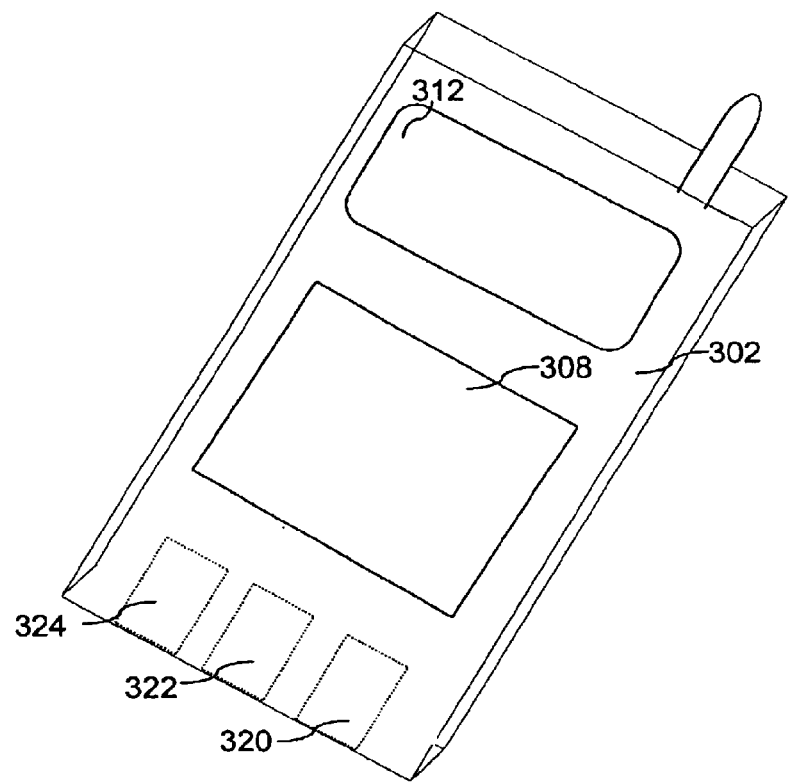
FIG. 5 is an illustration of a wireless telephone device and a battery charger in accordance with a third exemplary embodiment of the present invention.
Figure 5:
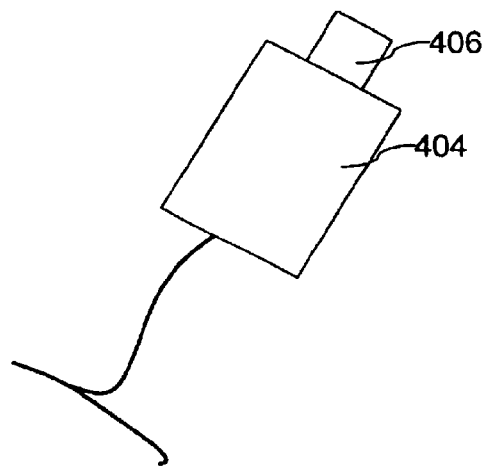

Another exemplary embodiment of the invention is illustrated in FIG. 5. In this embodiment, wireless telephone device 302 includes multiple charger ports 320, 322, 324. The wireless telephone device 302 has a forwarding number stored in internal memory 116 in association with each charging port 320, 322, 324. In this way, when wireless telephone device 302 is connected to charger 404 via charger interface 406, the user picks one of the multiple charger ports 320, 322, 324 in which to plug the charger interface 406. When the charger interface 406 is connected to one of the multiple charger ports 320, 322, 324, wireless telephone device 302 will detect which port is operative, connect to the wireless provider, enable the call forwarding feature and send to the wireless provider the forwarding telephone number associated with the connected charger port 320, 322, 324. When the wireless telephone device 302 is disconnected from the charger 304, the wireless telephone device 302 will connect with the wireless service provider and disable the call forwarding operation.

Figure 6:
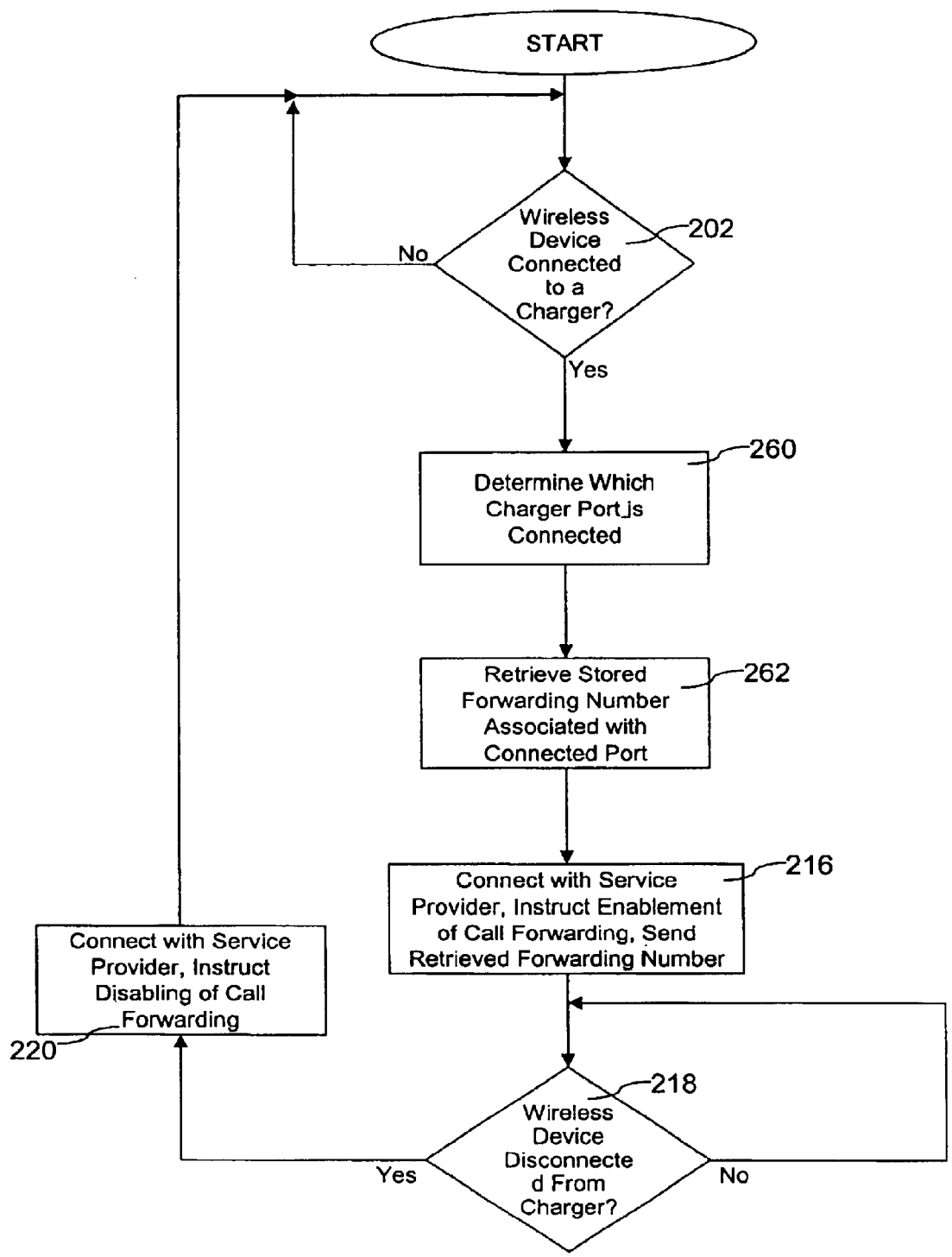
FIG. 6 is a flow chart of the operations performed by the wireless telephone device shown in FIG. 5.

The operations performed by wireless device 302 for the system illustrated in FIG. 5 are shown in FIG. 6.

As shown, in processing segment 202 the wireless telephone device 302 determines whether or not it is connected to a charger. If not, the wireless telephone device 302 waits until it detects connection to a charger. If a charger connection is detected in processing segment 202, the wireless telephone device proceeds to processing segment 260 where it determines to which charger port the charger is connected. Based on that determination, the wireless telephone device proceeds to processing segment 262, where it retrieves the stored forwarding number which is associated with the connected port. After processing segment 262, the wireless telephone device 302 proceeds to processing segment 216 where it connects with a service provider, instructs the enablement of a call forwarding operation, and sends the retrieved forwarding number to the service provider. Following this, the wireless device 302 proceeds to processing segment 218 where it determines if it disconnected from the charger. If not, the wireless device 302 loops through processing segment 218 until it determines that it has been disconnected from the charger. Once a disconnection is determined in processing segment 218, the wireless device then connects with the service provider and instructs the disabling of the call forwarding operation in processing segment 220, following which the wireless device 302 process proceeds back to the input of processing segment 202.

Figure 7:
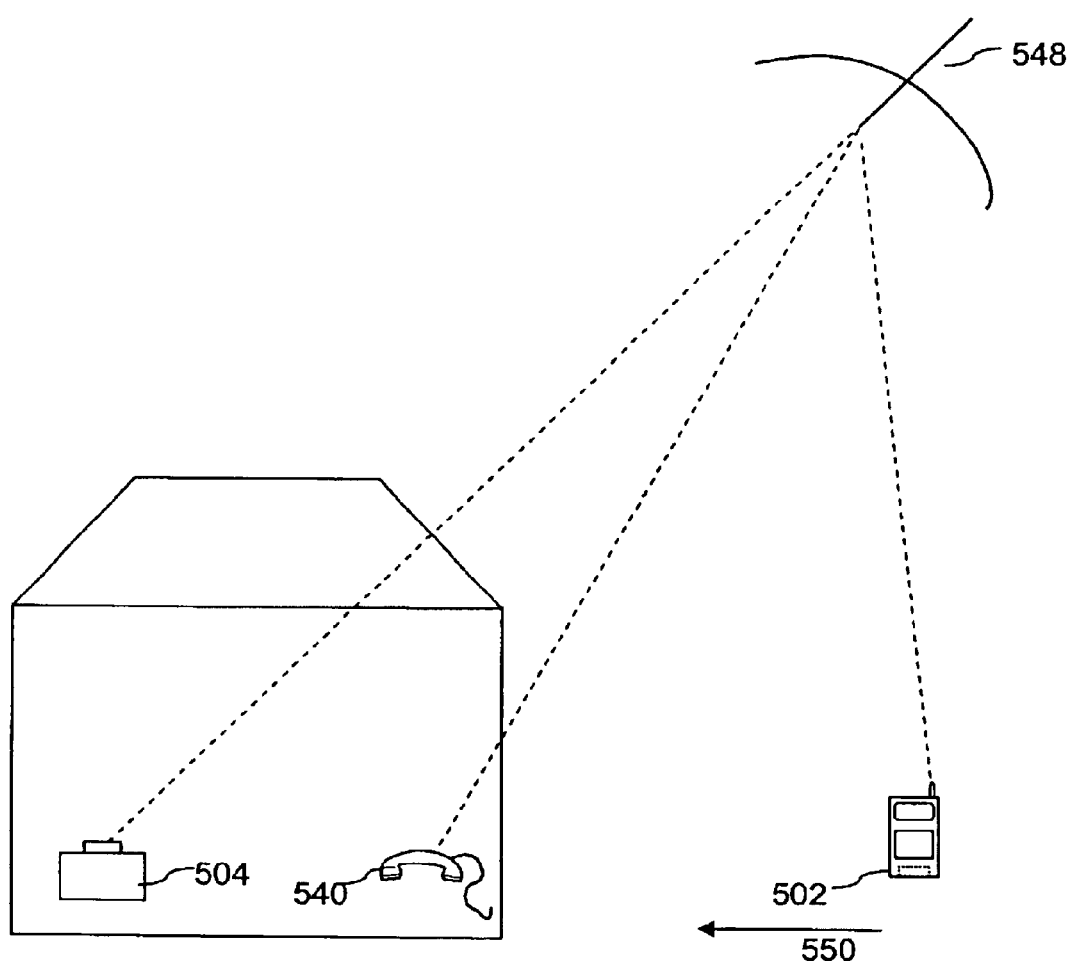
FIG. 7 is an illustration of a wireless telephone device and an associated GPS system in accordance with a fourth exemplary embodiment of the invention.
Figure 8:
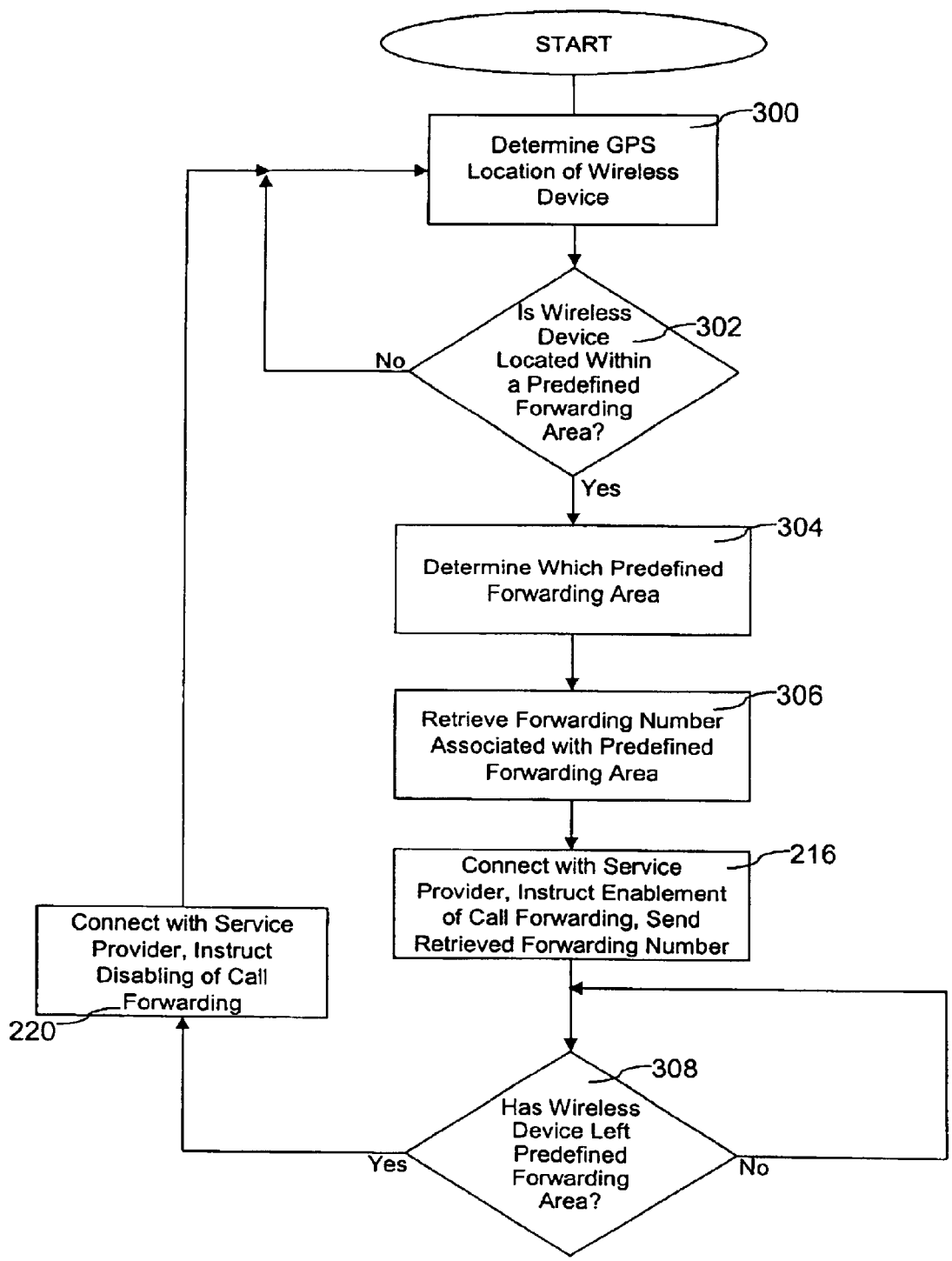
FIG. 8 is a flow chart depicting the operations of the wireless telephone device shown in FIG. 7.

In yet another embodiment illustrated in FIG. 7, a wireless device 502 can be used with a global positioning satellite (GPS) system 548 for an automatic call forwarding operation. In this embodiment, the GPS system 548 provides location data to the wireless device 502, which includes a location determining device, for example, a GPS receiver 114 (FIG. 9). Location data can be collected by wireless telephone device 502 for specific locations or objects designated by the wireless user. For example, locatable objects may include a charger 504 or land line telephone 540. For each designated object or location, the wireless user stores coordinate data in wireless telephone device 502 for the object or location by, for example, bringing wireless telephone device 502 to the location of the designated objects, taking a location coordinate measurement using, for example, GPS receiver 114 (FIG. 9), and then storing that measurement within the wireless device 502 in correspondence with an identification of a particular object or location. A user can then assign a forwarding number for each stored object or location coordinate information which is stored in memory 116. Later, when the wireless telephone device 502 is within a predefined distance of such a locatable object or location , for example, within 50 feet of a charger 504, determined by wireless device 502 comparing its present location to the prestored coordinate information, the wireless device 502 can connect to the wireless provider, enable the call forwarding feature, and send a forwarding number which is associated with the object or location which the wireless device 502 is within the predefined distance of The processing performed by the wireless device illustrated in FIG. 7 is shown in FIG. 8. As shown therein, in a first processing segment 300, the wireless telephone device 502 determines its location through a location determination device, for example, a GPS receiver 114. Once the location is determined, the wireless device 502 proceeds to processing segment 302, where it determines whether or not the wireless device is located within a predefined forwarding area. This would mean whether or not the wireless device is within a predefined distance of a predetermined location. Predetermined location information for one or more objects and/or locations, for example, the location of charger 504 or land-line telephone 540, are acquired and prestored in memory 116 of telephone device 502. If the wireless device is within a predefined distance of a predetermined location as detected in processing segment 302, the wireless device 502 proceeds to processing segment 304, where it determines which forwarding area it is in, and from that it retrieves in processing segment 306 a forwarding number associated with that predefined area from memory 116. Following this, in processing segment 216, the wireless device 502 connects with a service provider, instructs enablement of a call forwarding operation, and sends the retrieved forwarding number. After this, the wireless device 502 determines if it has left the predefined forwarding area in processing signal 308. If not, the wireless device 502 loops through processing segment 308 until it leaves the predefined area, as detected in processing segment 308. Once the wireless device 502 detects that it has left the predefined forwarding area in processing segment 308, the wireless device proceeds to processing segment 220, where it connects with the service provider, and instructs the disabling of the call forwarding operation. From there the wireless device proceeds back to processing segment 300.

As a consequence of these operations, when the wireless device is within a predefined forwarding area, that is within a predetermined distance of a predetermined location, the call forwarding feature is automatically engaged and a number associated with the predetermined location is sent to the wireless service provider; whereas when the wireless device leaves the predefined area, the call forwarding operation is automatically disabled.

It is to be understood that the above description is intended to be illustrative and not restrictive of the invention. Many variations to the above-described system and method will be readily apparent to those having ordinary skill in the art. Accordingly, the scope of the present invention is not to be considered as limited by the specifics of the particular systems and methods which have been described and illustrated above, but is only limited by the scope of the appended claims.

What is claimed as new and desired to be protected by Letters Patent of the United States is:

1. A wireless telephone device comprising:
   a transceiver for transmitting and receiving wireless signals;
   a control circuit for determining when said wireless telephone device is at a location where a call forwarding operation should occur;

said control circuit automatically operating said transceiver to initiate a connection between said telephone device and a service provider when said telephone device is at said location and instructing said service provider to enable a call forwarding operation, said control circuit further operating said transceiver to send a forwarding number to said service provider, wherein said location is a location of a power source for said wireless device, and wherein a user of the device is allowed to change the call forwarding number after the device has been connected to the power source.

2. A wireless telephone device as in claim 1 wherein said wireless device further comprising at least one port for connecting with said power source, said control circuit determining when said wireless device is at said location by determining if said at least one port is connected with said power source.

3. A wireless telephone device as in claim 2 wherein said power source is a battery charger.

4. A wireless device as in claim 2 wherein said control circuit receives through said port said forwarding number which is stored at said power source.

5. A wireless telephone device as in claim 4 wherein said control circuit is operative to cause a forwarding number entered at said wireless device to be stored at said power source.

6. A wireless device as in claim 2, wherein said power source has an associated identification number, said wireless device further comprising a memory for storing at least one forwarding number in respective association with at least one a power source identification number, wherein said control circuit receives identification information from said power source and selects a forwarding number from said memory which is associated with said received identification information for sending to said provider.

7. A wireless telephone device as in claim 1 wherein said control circuit determines when said wireless telephone device is no longer at said location and in response initiates a connection between said wireless device and said service provider, and instructs said service provider to disable said call forwarding operation.

8. A method of operating a wireless telephone device comprising:

determining when said wireless telephone device is at a location where a call forwarding operation should occur;

automatically establishing a connection to a service provider in response to said determination, and during said connection:

instructing said service provider to initiate a call forwarding operation; and sending a forwarding number to said service provider, wherein said location is a location of a power source for said wireless device, and wherein a user of the device is allowed to change the call forwarding number after the device has been connected to the power source.

9. A method as in claim 8 wherein said determination is made when said wireless device is connected to said power source.

10. A method as in claim 9 wherein said power source is a battery charger.

11. A method as in claim 9 further comprising receiving said sent forwarding number from said power source.

12. A method as in claim 11 further comprising storing a forwarding number in said storage area of said power source.

13. A method as in claim 9 further comprising:

storing a plurality of forwarding numbers in respective association with a power source identification information;

determining an identification number of a power source connected to said wireless telephone device; and selecting as said sent forwarding number a stored forwarding number associated with said determined identification information.

14. A method as in claim 8 further comprising:

determining when said wireless telephone device is no longer at said location and in response automatically initiating a connection between said wireless device and said service provider and instructing said service provider to disable said call forwarding operation.

15. A wireless telephone device comprising:

a transceiver for transmitting and receiving wireless signals;

a control circuit for determining when said wireless telephone device is at a location where a call forwarding operation should occur, said control circuit automatically operating said transceiver to initiate a connection between said telephone device and a service provider when said telephone device is at said location and instructing said service provider to enable a call forwarding operation, said control circuit further operating said transceiver to send a forwarding number to said service provider;

a plurality of ports for connection with a power source, wherein said location is a location of said power source, said control circuit determining when said wireless device is at said location by determining if one of said plurality of ports is connected with said power source; and a memory for storing a plurality of forwarding numbers in respective association with said plurality of ports, said control circuit selecting a forwarding number in accordance with a port which is connected to said power source and causing said selecting forwarding number to be sent to said service provider, wherein a user of the device is allowed to change the call forwarding number after the device has been connected to the power source.

16. A method of operating a wireless telephone device comprising:

determining when said wireless telephone device is at a location where a call forwarding operation should occur, wherein said location is a power source for said wireless device and said determination is made when said wireless device is connected to said power source, wherein said wireless telephone device has a plurality of connection ports for connection with said power source;

storing a plurality of forwarding numbers in respective association with said plurality of connection ports;

selecting as a forwarding number a stored forwarding number which is associated with a port to which said power source is connected;

automatically establishing a connection to a service provider in response to said determination, and during said connection:

instructing said service provider to initiate a call forwarding operation; and sending said forwarding number to said service provider, wherein a user of the device is allowed to change the call forwarding number after the device has been connected to the power source.

* * * * *